3,493,569
3-AMINOALKYLTHIO-as-TRIAZINO[5,6-b]-INDOLES

Jan Mieczyslaw Zygmunt Gladych, Hertford, and John Harold Hunt, Theydon Bois, Essex, England, assignors to Allen and Hanburys Limited, London, England
No Drawing. Continuation-in-part of application Ser. No. 658,644, Aug. 7, 1967. This application July 16, 1968, Ser. No. 745,88
Claims priority, application Great Britain, Sept. 17, 1963, 36,551; Feb. 20, 1964, 7,168; Aug. 27, 1964, 35,190; July 18, 1967, 33,050
Int. Cl. C07d 57/34; A61k 27/00
U.S. Cl. 260—247.1                    7 Claims

ABSTRACT OF THE DISCLOSURE

As-triazino[5,6-b]indoles of the formula:

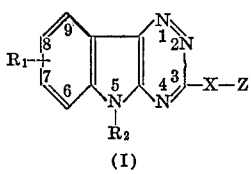

(I)

where $R_1$ is hydrogen, a halogen atom, alkyl of 1–4 carbon atoms, hydroxy, alkoxy, nitro, amino or trifluoromethyl; $R_2$ is hydrogen, lower alkyl of 1–4 carbon atoms, benzyl or phenethyl; X is sulphur; and Z is AlkNR$_4$R$_5$, where Alk is a branched or straight chain alkylene of 2 to 10 carbon atoms and $R_4$ and $R_5$ are hydogen or alkyl of 1–4 carbon atoms or together with the adjacent nitrogen atom form a heterocyclic ring which may contain additional hetero atoms, exhibit antiviral activity. Pharmaceutically acceptable non-toxic salts are within the scope of the above compounds. Particularly valuable compounds are those substituted in the 3-position with an aminoalklmercapto moiety.

---

This application is a divisional continuation-in-part of Ser. No. 658,644, filed Aug. 7, 1967, which is a continuation-in-part of Serial No. 396,727, filed September 15, 1964, now abandoned.

The present invention is concerned with novel heterocyclic compounds. More particularly, the present invention is concerned with as-triazino [5,6-b]indoles of the general formula:

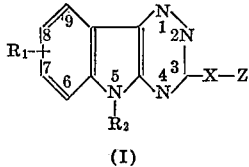

(I)

where $R_1$ is hydrogen, a halogen atom, alkyl of 1–4 carbon atoms, hydroxy, alkoxy, nitro, amino or trifluoromethyl; $R_2$ is hydrogen, lower alkyl of 1–4 carbon atoms, benzyl or phenethyl; X is sulphur; and Z is AlkNR$_4$R$_5$, where Alk is a branched or straight chain alkylene of 2 to 10 carbon atoms and $R_4$ and $R_5$ are hydrogen or alkyl of 1–4 carbon atoms or together with the adjacent nitrogen atom form a heterocyclic ring which may contain additional hetero atoms.

The compounds of Formula I are bases and form acid addition and quarternary ammonium salts. The pharmaceutically acceptable non-toxic salts form a part of the present invention.

Among the compounds of the invention, there may be mentioned 3-(2-morpholinoethylmercapto)-5-methyl-as-triazino [5,6-b]indole, 3-(2-diethylaminoethylmercapto)-5-methyl-as-triazino [5,6-b]indole, 3-(2-dimethylaminoethylmercapto)-5-methyl-as-triazino [5,6-b]indole and 5-methyl - 3-(2-piperidinoethylmercapto)-as-triazino[5,6-b] indole.

The compounds of Formula I may be prepared by the cyclization of isatin β-thiosemicarbazones of the general formula

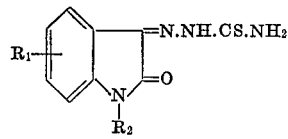

(II)

wherein $R_1$ and $R_2$ have the meanings given above, to give 3-mercapto-as-triazino[5,6-b]inodoles of the general formula

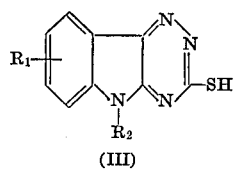

(III)

wherein $R_1$ and $R_2$ have the meanings given above, and converting the compounds of formula III to compounds of Formula I by conventional methods.

The thiosemicarbazones of Formula II may be cyclized to give the compounds of Formula III by, for example, refluxed together in aqueous potassium carbonate solusium carbonate. Alternatively, the thiosemicarbazones need not be isolated in which case thiosemicarbazide and the isatin of formula

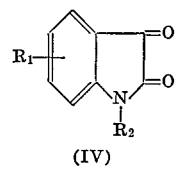

(IV)

wherein $R_1$ and $R_2$ have the meanings given above, are refluxed together in aqueous potassium carbonate solution.

The compounds of Formula III are converted to compounds of Formula I by conventional methods, that is, by methods known in the art for converting a SH radical into other radicals of the general formula X—Z, wherein X and Z have the meaning given above. For instance, a 3-mercapto-as-triazino-[5,6-b]indole of Formula III may be reacted with an alkylating agent, in order to replace the hydrogen of the SH group with an AlkNR$_4$R$_5$ radical wherein Alk, $R_4$ and $R_5$ have the meaning given above. Examples of suitable agents include simple alkylating agents such as aminoalkyl chlorides such as morpholinoethyl chloride and diethylaminoethyl chloride. Preferably the 3-mercapto-as-triazino[5,6-b]indole of Formula III is condensed with the alkylating agent in the presence of an alkaline condensing agent such as sodium hydroxide or a sodium alkoxide. The compounds of Formula III can also exist in the tantomeric structure, that is, with the thione group, C=S, in the 3-position.

If desired, the basic compounds of Formula I obtained by any of the processes given above may be quarternized or converted into their salts with inorganic or organic acids.

For the purpose of further illustration of this invention, the following examples are set forth in detail below.

EXAMPLE 1

Preparation of 3-mercapto-5-methyl-as-triazino[5,6-b]indole (a) 6.0 g. of N-methylisatin thiosemicarbazone was suspended in 1.5 l. of water containing 15 ml. of ammonia solution of sp. gr. 0.880 and the mixture was boiled under reflux for 24 hours. After cooling, a small amount of insoluble material was removed by filtration and discarded. The filtrate was evaporated under reduced pressure to about one third of its volume and, after cooling, the yellow solid which separated was filtered off and recrystallized from 50% aqueous dimethylformamide; 3 - mercapto - 5 - methyl - as - triazino[5,6-b]indole was obtained, M.P. 279°–281° C.

The following compounds were prepared in a similar manner:

3-mercapto-as-triazino[5,6-b]indole, M,P. higher than 360° C.
3-mercapto-5-ethyl-as-triazino[5,6-b]indole, M.P. 294° C.
3-mercapto-5-propyl-as-triazino[5,6-b]indole, M.P. 278° C.

(b) 5 g. of N-methylisatin thiosemicarbazone was suspended in 100 ml. of water containing 4.4 g. of potassium carbonate and the mixture was boiled under reflux for 75 minutes. The orange colored solution was cooled, diluted with 100 ml. of water and acidified with acetic acid. The yellow solid which separated was filtered off, washed with water, dried at 100° C. and recrystallized from a large volume of methanol to give 3-mercapto-5-methyl-as-triazino[5,6-b]indole, M.P. 278° to 282° C.

The following compounds were prepared in a similar manner:

3-mercapto-as-triazino[5,6-b]indole, M.P. higher than 360° C.
3-mercapto-5-methyl-8-chloro-as-triazino[5,6-b]indole, M.P. 315° to 316° C.
3-mercapto-8-nitro-as-triazino[5,6-b]indole, M.P. higher than 350° C.
3-mercapto-8-methoxy-as-triazino[5,6-b]indole, M.P. 331° C.
3-mercapto-5-methyl-8-bromo-as-triazino[5,6-b]indole, M.P. higher than 350° C.
3-mercapto-5-methyl-8-nitro-as-triazino[5,6-b]indole, M.P. 283° C.

(c) 16 g. of N-methylisatin, 10 g. of thiosemicarbazide and 21 g. of potassium carbonate were boiled under reflux in 500 ml. of water for 7 hours. A small amount of insoluble material was removed by filtration and discarded and the filtrate was cooled and acidified with acetic acid. The solid which separated was filtered off, washed with water and dried at 100° C. to give 3-mercapto-5-methyl-as-triazino[5,6-b]indole, M.P. 275° to 281° C.

The following compounds were prepared in a similar manner:

3-mercapto-7-methoxy-as-triazino[5,6-b]indole, M.P. 309° C.
3-mercapto-5-propyl-8-chloro-as-triazino[5,6-b]indole, M.P. 270° to 275° C.

EXAMPLE 2

Preparation of 3-(2-morpholinoethylmercapto)-5-methyl-as-triazino[5,6-b]indole 10.8 g. of 3-mercapto-5-methyl-as-triazino[5,6-b]indole was dissolved in 120 ml. 1 N sodium hydroxide. A solution of 10.1 g. of morpholinoethyl chloride hydrochloride in 25 ml. of water was added in portions with shaking during 10 minutes. An immediate yellow precipitate redissolved almost completely. The mixture after standing for 30 minutes was poured into water and the crude product which crystallized out after adding sodium chloride, was filtered off, and recrystallized from 300 ml. of methanol, giving cream colored needles, M.P. 146° to 147° C.

EXAMPLE 3

Preparation of 3-(2-diethylaminoethylmercapto)-5-methyl-as-triazino[5,6-b]indole 10.8 g. of 3-mercapto-5-methyl-as-triazino[5,6-b]indole was dissolved in 120 ml. 1 N sodium hydroxide. A solution of 9.5 g. of diethylaminoethyl chloride hydrochloride in 25 ml. of water was added in portions with shaking during 10 minutes. The initial yellow precipitate dissolved to a clear solution which soon commenced to deposit a dense mass of needles. The mixture after standing for 30 minutes was poured into water, the buff colored solid filtered off and recrystallized from 100 ml. of 50% aqueous ethanol; cream colored needles, M.P. 101° to 103° C., were obtained.

The following compound was prepared in a similar manner:

3-(2-dimethylaminoethylmercapto)-5-methyl-as-triazino[5,6-b]indole M.P. 128° C.

EXAMPLE 4

Preparation of 3-(2-piperidinoethylmercapto)-5-methyl-as-triazino[5,6-b]indole

To a solution of sodium methoxide prepared from 0.8 g. of sodium metal in 100 ml. of methanol, was added a suspension of 8 g. of 3-mercapto-5-methyl-as-triazino[5,6-b]indole in 100 ml. of methanol. 5 g. of 1-(2-chloroethyl)piperidine hydrochloride in 50 ml. of methanol was added, and the mixture refluxed 6 hours. The methanol was distilled off under reduced pressure and the residual solid was recrystallized from ethanol and dissolved in 50 ml. of water. The aqueous solution was basified with 43% sodium hydroxide solution, giving an oil which was extracted with ether (3×20 ml.). The combined ether extracts were dried over $Na_2SO_4$ and evaporated, leaving a brown solid, which was recrystallized from acetone; 1 g., M.P. 143° to 144° C.

The compounds of the invention possess antiviral activity, against rhinoviruses, vaccinia virus, influenza A, parainfluenza, herpes simplex, vesicular stomatitis, reovirus, and Echo viruses.

The preferred compound of the invention, 3-(2-morpholinoethylmercapto) - 5 - methyl - as - triazino[5,6-b]indole, is highly active in the rhinovirus tube dilution test. It is also active in the vaccinia mouse tail test at 300 mg./kg. orally. It is additionally active in the plaque inhibition test against influenza A, parainfluenza, herpes simplex, and Echo viruses. Another preferred compound is 3 - (2 - diethylaminoethylmercapto) - 5 - methyl - as - triazino[5,6-b]indole.

The compounds of the invention may be formulated for use in a manner well known to pharmaceutical chemists by combining them with standard pharmaceutical excipients to form tablets, capsules, ointments and intranasal preparations. The oral formulations may contain between 100 mgs. and 1 g. and may be administered 1–4 times daily.

The preparation of these pharmaceutical compositions is illustrated below.

EXAMPLE 5

Capsules.—300 kg. of one of the compounds of this invention, for instance, 3-(2-morpholinoethylmercapto)-5-methyl-as-triazino[5,6-b]indole, are finely divided in a comminuting mill to produce a 60 B.S. mesh powder. This powder is filled into No. 1 hard gelatin capsules so that each capsule contains 300 mg. of the active ingredient.

EXAMPLE 6

Tablets.—3.00 kg. of one of the compounds of this invention, for example, 3-(2-morpholinoethylmercapto)-5-methyl-as-triazino-[5,6-b]indole, 300 g. of maize starch, 400 g. of lactose and 80 g. of hydrolyzed gelatin are mixed together, then sufficient distilled water is added to produce a damp cohesive mass. The mass is passed through a 16 B.S. mesh screen to produce granules which are dried and then passed through a screen to produce 20 B.S. mesh granules. The dried granules are mixed with 300 g. of maize starch, 800 g. of micro-crystalline cellulose, 60 g. of polyethylene glycol 4000 and 60 g. of magnesium stearate. The lubricated granules are compressed on a suitable tabletting machine to produce tablets each weighing 500 mg. and containing 300 mg. of 3-(2-morpholinoethylmercapto) - 5 - methyl-as-triazino[5,6-b]indole.

EXAMPLE 7

Nasal suspension.—100 g. of sodium carboxymethylcellulose of medium viscosity grade, are dissolved in 5 litres of distilled water. When solution is complete, 20 g. of sodium citrate, 13 g. of potassium biphthalate, 0.1 g. of thiomersal and 2 ml. of eucalyptol are added. The mixture is stirred until solution takes place. 500 g. of one of the compounds of this invention, for instance, 3-(2-morpholinoethylmercapto) - 5 - methyl-as-triazino[5,6-b]indole, are slowly dispersed in the gel, and the volume is made up to 10 litres with distilled water.

EXAMPLE 8

3-(2-morpholinoethylmercapto)-5-methyl-8-trifluoromethyl-as-triazino[5,6-b]indole To a stirred 500 cc. three-neck flask were added the following: 9.0 g. (0.054 m.) of chloral hydrate in 60 ml. water, 120 g. of crystalline sodium sulfate, 8.76 g. (0.05 m.) of p-trifluoromethyl-N-methylaniline (prepared by reacting p-trifluoromethyl bromobenzene with 5 equivalents of methylamine in a steel bomb at 110° for 8 hours) dissolved in 30 ml. of water containing 4.2 cc. of conc. HCl, and finally a solution of 11.0 g. (0.158 m.) hydroxylamine HCl in 50 ml. of water. The contents were heated to boiling and refluxed while stirring for 4 minutes. The aqueous mixture was cooled and extracted with chloroform. After drying and concentration of the organic layer, 5.5 g. (41.5% yield) of an off-white solid product was obtained. It was immediately cyclized to the isatin without further purification.

A mixture of 5.5 g. (0.022 m.) of p-trifluoromethyl-N-methylisonitrosoacetanilide and 25 cc. of conc. $H_2SO_4$ was heated on the steam bath for 10 minutes and poured on crushed ice. The orange solid was collected. It weighed 3.8 g. (75.5% yield). After purification from a mixture of ethyl acetate and petroleum ether, the orange crystals of 5-trifluoromethyl-N-methylisatin melted at 131°–133° C.

A mixture of 3.8 g. (0.0165 m.) of 5-trifluoromethyl-N-methylisatin and 150 cc. of water containing 1.6 g. thiosemicarbazide and 4.6 g. $K_2CO_3$ was refluxed for 17 hours. The dark amber solution was filtered from any insolubles, cooled and acidified with glacial acetic acid. The precipitated yellow solid was collected and dried. It weighed 4.0 g. giving an 85% crude yield. It was purified from a mixture of methanol and dimethylformamide giving 3 - mercapto - 5 - methyl-8-trifluoromethyl-as-triazino[5.6-b]indole, M.P. of 270°–275° C.

Reaction with morpholinoethyl chloride hydrochloride as in Example 2 gives the product.

EXAMPLE 9

3-(3-morpholinopropylmercapto)-8-fluoro-5-methyl-as-triazino[5,6-b]indole

A stirred mixture of 5.8 g. (.0324 m.) of 1-methyl-5-fluoroisatin, 3.25 g. (.0358 m.) of thiosemicarbazide, 5.6 g. of anhydrous potassium carbonate, and 650 ml. of water was heated under reflux for 5 hours, cooled and filtered, and the filtrate was acidified with glacial acetic acid. The precipitated yellow solid was filtered off, washed with water, and dried. Yield, 7.6 g. (quant.); M.P. 300°–305° C. (dec.).

An analytical sample of the 3-mercapto-5-methyl-8-fluorotriazinoindole was recrystallized from aqueous dimethylformamide, M.P. 308°–310° C. (dec.).

Treatment of the 3-mercapto compound with 3-morpholinopropyl chloride hydrochloride according to the procedure of Example 2 gives the title product.

EXAMPLE 10

8-butyl-5-methyl-3-(2-piperidinoethylmercapto)-as-triazino[5,6-b]indole

To a stirred solution of 4.06 g. (.02 m.) of 5-butylisatin in 60 ml. of methanol was added in small portions 20 ml. of 10% methanolic potassium hydroxide followed by 3.0 ml. of dimethyl sulfate in one portion. The temperature rose to 35°. Stirring was continued for 50 minutes, the solid potassium methyl sulfate was removed by filtration, and the solvent was evaporated from the filtrate under reduced pressure. The residual red syrup was treated with 100 ml. of 3 N HCl, heated on a steam bath for 5 minutes, and the cooled mixture was extracted three times with ether totaling 300 ml. The combined extracts were dried over anhydrous magnesium sulfate, and the ether was evaporated to give 3.55 g. (83%) of 1-methyl-5-butylisatin as a red syrup, which was used without further purification.

A stirred mixture of 3.50 g. (.0161 m.) of the above 1-methyl-5-butylisatin, 1.62 g. (.0178 m.) of thiosemicarbazide, 2.8 g. of potassium carbonate, and 370 ml. of water was heated under reflux for 5 hours. The cooled reaction mixture was clarified by filtration, and the filtrate was acidified with glacial acetic acid. The precipitated yellow 3-mercapto-5-methyl-8-butyltriazinoindole was collected by suction filtration and purified by recrystallization from glacial acetic acid. Yield, 2.68 g. (61%); M.P. 242–244° C. (dec.).

An analytical sample was recrystallized from aqueous dimethylformamide, M.P. 243°–245° C. (dec.).

Treatment of the 3-mercapto compound with 2-piperidinoethyl chloride hydrochloride as deschibed in Example 4 gives the title product.

EXAMPLE 11

3-(3-dimethylaminopropylmercapto)-5,8-dimethyl-as-triazino[5,6-b]indole 1,5-dimethylisatin (2.0 g.), 1.25 g., of thiosemicarbazide and 1.94 g. of potassium carbonate were refluxed in 400 ml. of water for 6 hours. The clear yellow solution was acidified with glacial acetic acid and the yellow 3-mercapto-5,8-dimethyl-as-triazino[5,6-b]indole collected; M.P. 299–301° C.

Treatment of the 3-mercapto compound with 3-dimethylaminopropyl chloride hydrochloride as described in Example 3 gives the title product.

EXAMPLE 12

3-(2-morpholinoethylmercapto)-8-methoxy-5-methyl-as-triazino-[5,6-b]indole 5-methoxy-N-methylisatin (0.5 g.), 0.263 g. of thiosemicarbazide and 0.447 g. of potassium carbonate were suspended in 100 ml. of water and refluxed for 20 hrs. Upon acidifying the clear yellow-orange solution an orange solid precipitated (3 - mercapto - 5 - methyl-8-methoxy-as-triazino-[5,6-b]indole); M.P. 310–312° C.

Treatment of the 3-mercapto compound with 2-morpholinoethyl chloride hydrochloride as in Example 2 gives the product.

EXAMPLE 13

8-butoxy-3-(2-morpholinoethylmercapto)-5-methyl-as-triazino-[5,6-b]indole

To a stirring mixture of 16.5 g. (0.1 m.) of p-butoxyaniline in 48 cc. benzene and 36 cc. water containing 3.75 g. NaOH was added dropwise 9.6 g. of acetic anhydride.

Temperature was kept between 30°–35° C. with an ice bath. After addition the mixture was stirred at room temperature for 0.5 hr. The precipitated white crystalline solid was collected, washed with cold benzene and dried. The product p-butoxyacetanilide weighed 20.3 g. (98.8% yield). M.P. was 110°–112° C. It was used further without purification.

To a hot solution of 20.7 g. (0.1 m.) of p-butoxyacetanilide in 200 ml. of dry toluene was added portionwise 4.9 gm. of sodium amide over a 20 minute period. Evolution of NH₃ was noted. After a 2½ hr. reflux, the heat source was removed and 12.6 g. (0.1 m.) of dimethyl sulfate was added dropwise. Contents were refluxed again for 0.5 hr. and poured into 200 ml. of water. The organic layer was separated and dried over MgSO₄. After concentration in vacuo, 20.5 g. (92%) of liquid residue of p-butoxy-N-methylacetanilide was obtained. This was immediately hydrolyzed as described below.

A solution of 20.5 g. (0.092 m.) of p-butoxy-N-methylacetanilide in 81 cc. of ethanol and 9 cc. of water containing 22.5 g. KOH was refluxed for 17 hours. Alcohol was removed in vacuo and the aqueous mixture extracted with benzene. The organic layer was dried and concentrated in vacuo leaving 13.3 g. of brown liquid residue. Distillation at 96°–102° C./0.2 mm. gave 11.3 g. (69% purified yield) of p-butoxy-N-methylaniline.

To a solution of 8.6 g. (0.043 m.) of p-butoxy-N-methylaniline in 32 ml. of dry benzene containing 3.5 g. of dry pyridine was added dropwise 6.12 g. (0.048 m.) of ethyl oxalyl chloride. The mixture was refluxed for 0.5 hour, the pyridine .HCl salt was removed by filtration and the clear filtrate was concentrated in vacuo to give 14.3 g. of crude yellow residue. The fraction boiling at 145°–150° C./v0.5 mm. was collected. It weighed 11.3 g., giving a 94% yield of p-butoxy-N-methyl-N-ethyloxalyl aniline, which was then cyclized to the isatin.

To a solution of 11.3 g. (0.04 m.) of the above in 46 ml. of carbon tetrachloride was added portionwise 8.37 g. (0.04 m.) of phosphorus pentachloride.

Contents were stirred at room temperature for 45 min., the yellowish solution was concentrated in vacuo and the viscous residue was poured on crushed ice. The red oily product was extracted with chloroform and dried over MgSO₄. After concentration, 10 g. of red viscous 5-butoxy-N-methylisatin was obtained.

9 g. (0.038 m.) of 5-butoxy-N-methylisatin and 3.8 g. of thiosemicarbazide in 250 cc. of water containing 11.8 g. K₂CO₃ were refluxed for 19 hours. The deep red solution was filtered from insolubles and acidified with glacial acetic acid. The precipitated orange solid was collected and dried. The 3-mercapto-5-methyl-8-butoxy-as-triazino [5,6-b]indole weighed 6.4 g. giving a 59% yield. After recrystallization from methanol-dimethylformamide, it gave a M.P. of 251.5°–253.5° C.

Treatment of the 3-mercapto compound with 2-morpholinoethyl chloride hydrochloride as in Example 2 gives the product.

EXAMPLE 14

8-bromo-5-methyl-3-(2-morpholinoethylmercapto)-as-triazino-[5,6-b]indole

To a stirred suspension of 2.3 g. (0.01 m.) of 5-bromoisatin in 25 ml. of methanol was added 10 ml. of 10% methanolic KOH followed by 1.5 ml. of dimethyl sulfate Stirring at room temperature was continued for 45 minutes. The white potassium methyl sulfate salt was removed by filtration and the clear red filtrate was concentrated in vacuo. The solid residue was triturated with aqueous alcohol and filtered to give 1.65 g. (68.8% yield) of 5-bromo-N-methylisatin. After purification from ethanol the deep orange needles melted at 164°–166° C.

A mixture of 0.5 g. (0.002 m.) of 5-bromo-N-methylisatin, 0.2 g. (0.0022 m.) of thiosemicarbazide and 0.6 g. K₂CO₃ in 25 ml. of water was refluxed for 4½ hours. Complete solution resulted. It was filtered hot from any insolubles, cooled and acidified with glacial acetic acid; 0.55 g. of orange solid was obtained (93% crude yield). It was recrystallized from CH₃CN—MeOH mixture to give orange needles of 8-bromo-3-mercapto-5-methyl-as-triazino[5,6-b]indole melting at 289°–291° C.

Treatment of the 3-mercapto compound with 2-morpholinoethyl chloride hydrochloride as in Example 2 gives the product.

EXAMPLE 15

8-hydroxy-3-(2-morpholinoethylmercapto)-5-methyl-as-triazino-[5,6-b]indole

Treatment of the 8-methoxy compound of Example 12 with refluxing 48% HBr for 1–2 hours under nitrogen gives this product.

EXAMPLE 16

8-amino-5-methyl-3-(2-morpholinoethylmercapto)-as-triazino-[5,6-b]indole

Treatment of the 8-bromo compound of Example 14 with liquid ammonia in the presence of a small amount of powdered copper and cuprous chloride in a closed pressure vessel at 110° C. for several hours gives this product.

What is claimed is:
1. A compound of the formula:

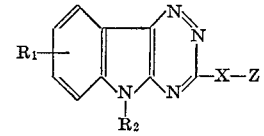

wherein

R₁ is hydrogen, halogen, alkyl of 1–4 carbon atoms, hydroxy, alkoxy of 1–4 carbon atoms, amino, or trifluoromethyl;

R₂ is hydrogen or lower alkyl of 1–4 carbon atoms;

X is sulfur;

Z is AlkNR₄R₅;

Alk is branched or straight chain alkylene of 2–10 carbon atoms; and

R₄ and R₅ are each hydrogen or alkyl of 1–4 carbon atoms, or together with the adjacent nitrogen atom, is morpholino or piperidino;

or a pharmaceutically acceptable non-toxic salt thereof.

2. A compound as claimed in claim 1, where R₂ is lower alkyl of 1–4 carbon atoms.

3. A compound as claimed in claim 2, which is 3-(2-morpholinoethylmercapto)-5-methyl-as - triazino[5,6-b]-indole.

4. A compound as claimed in claim 2, which is 3-(2-diethylaminoethylmercapto)-5-methyl - as - triazino[5,6-b]-indole.

5. A compound as claimed in claim 2, which is 3-(3-dimethylaminopropylmercapto)-5,8-dimethyl - as - triazino-[5,6-b]indole.

6. A compound as claimed in claim 2, which is 3-(2-morpholinoethylmercapto)-8-methoxy-5-methyl - as - triazino[5,6-b]indole.

7. A compound as claimed in claim 2, which is 8-amino-5-methyl-3-(2 - morpholinoethylmercapto) - as - triazino-[5,6-b]indole.

References Cited

Allen & Handburys Ltd., Chemical Abstracts, vol. 63, p. 13, 295h, (1965).

ALEX MAZEL, Primary Examiner

J. TOVAR, Assistant Examiner

U.S. Cl. X.R.

260—249.5; 424—248, 249